United States Patent Office.

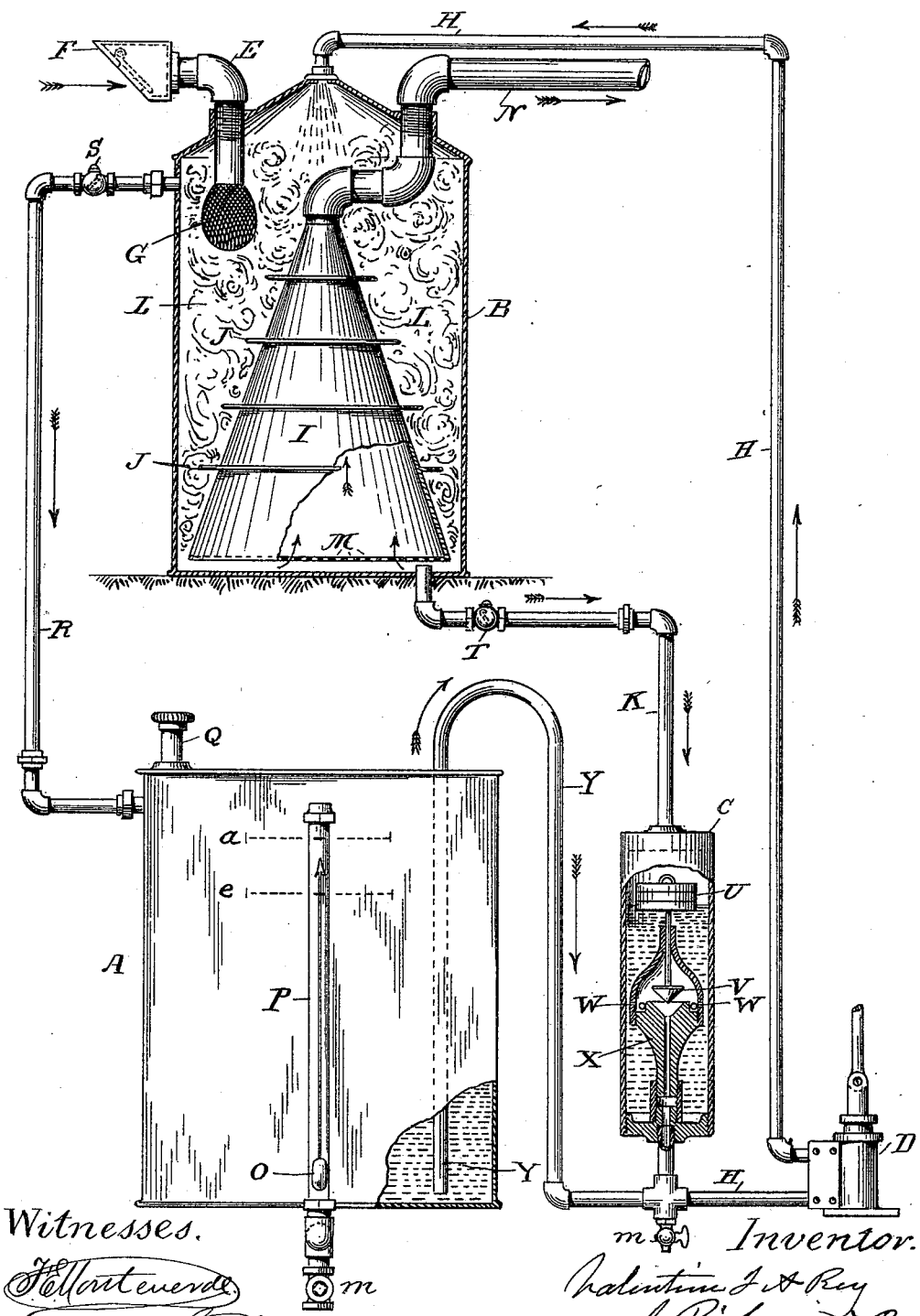

VALENTINE J. A. REY, OF SAN FRANCISCO, CALIFORNIA.

COMBINING APPARATUS.

SPECIFICATION forming part of Letters Patent No. 641,606, dated January 16, 1900.

Application filed March 4, 1899. Serial No. 707,747. (No model.)

*To all whom it may concern:*

Be it known that I, VALENTINE J. A. REY, a citizen of the United States, residing at San Francisco, county of San Francisco, and State of California, have invented certain new and useful Improvements in Combining Apparatus; and I hereby declare the following to be a full, clear, and exact description of the same, reference being had to the accompanying drawings, forming a part of this specification.

My invention relates to improvements in apparatus for incorporating or combining volatile liquids or solutions with air or other gases by saturation or chemically, as the nature of the substances permit.

My improvements consist in a combining-chamber in which the liquids or solutions are exposed to saturation and entrainment by air forced or drawn through the vessel and diffused by a fibrous filling therein, in devices to supply the volatile substance and disseminate the same in contact with the air, and in means to collect and return to the combining or mixing chamber any of the liquid or solution not volatilized on its first passage therethrough.

The object of my invention is to provide organized apparatus to saturate or combine with air volatile substances, especially liquids or solutions, for the purpose of disinfecting, quenching fire, moistening or saturating air for ventilating purposes, disseminating perfumes, and also, if required, to produce illuminating or other gases, such as are derived from volatile substances at a normal temperature.

Referring to the drawing herewith illustrating apparatus embodying my invention and forming a part of the specification, A is a supply-tank for liquid; B, the incorporating-chamber; C, an overflow or circulating chamber, and D a pump to circulate the liquid, the whole being connected by pipes, as hereinafter explained.

For convenience in terms and in order to render description more plain I will describe my improved apparatus as applied to moistening or saturating air with water or any volatile liquid, such as a solution of carbolic or carbonic acid, distillates, or oils of petroleum, and the like.

In the drawing the several parts of the apparatus are arranged in segregated form to enable plain description; but it will be understood that they can be disposed in a compact manner for portable purposes.

Referring first to the mixing or combining chamber B, E is an inlet-pipe for air, F an air-check valve, and G a screen to prevent the entry of dust or any substance carried in by the air; also, to diffuse the air at this point.

Liquid enters by the pipe H and falls on the conical open-bottomed chamber I, passing successively from one of the flanges J to the next, dripping from each constantly in a more diffused form until the surplus, if any, not taken up by the air descends to the bottom and passes through the pipe K to the vessel C and is returned again to the chamber B, as will be hereinafter explained. The chamber B is loosely filled with some pervious material L, such as comminuted wood or fibrous material of any suitable kind, to diffuse or disseminate the air and bring it into contact with the liquid or solution that is dripping from the flanges J or is contained in the material L by saturation. When the air is saturated and reaches the bottom of the chamber B, it passes or is drawn beneath the bottom of the vessel I and up through perforations, as seen at M, rises in this vessel, and is drawn out through the pipe N and sent to the place of use or consumption by means of any suitable air or gas impelling device—a fan, for example. This circulation and flow of the air and gas can be accomplished either inductively, as above described, or by forcing apparatus connected to the pipe E and valve F, as may best serve the circumstances of erection.

The fluid contained in the vessel A is supplied through an inlet-way Q and is preferably maintained at some level between the lines $a$ and $e$, a floating indicator O in a transparent tube P showing the height of the fluid in vessel A. To avoid a partial vacuum in this vessel A when the level of the contained fluid is lowered, I provide a pipe R, connecting this vessel with the chamber B, a check-valve at S preventing the flow of vapor or fluid back through this pipe. A similar check-valve T is placed in the pipe K for a like purpose.

A fluid not entrained or taken up by the air during its passage through the chamber B descends to the bottom and passes down through the pipe K into the chamber C, filling this chamber until the float U raises the valve V and permits the fluid above the perforations W to pass down the nipple X and into the pipe H. A buoyant ball-valve or any other suitable form can be employed in this chamber, which forms a seal against air or gas entering the pump D from the chamber B.

Circulation of the fluid is caused by the pump D, which draws its main supply from the bottom of the vessel A through the siphon-pipe Y and forces it through the pipe H, as before explained. Draining-cocks m are provided for the vessel A and pipes H and Y. The latter-named pipe is raised high enough to maintain a hydrostatic head above the float U in the chamber C.

On shipboard, where my improved combining apparatus has especial application, a series of the tanks A can be independently connected and filled with different liquid solutions adapted to several purposes—as, for example, to quench fire in inclosed quarters in the vessel, to saturate air with moisture and send the same through cabins, to disinfect any inclosed space below decks, and, if required, to produce illuminating-gas for lighting, the only change required being the removal of the fibrous filling L when saturated with some substance not suited to the change. Nearly the same conditions apply to public buildings, especially hospitals, where it is desirable to provide for the conveniences named and where it might be desirable to provide two or more sets of the apparatus in addition to several of the supply-tanks A.

Having thus explained my invention, I claim as new and desire to secure by Letters Patent—

1. In mixing or combining apparatus for fluids, a primary containing vessel for a liquid, a chamber for combining or saturating gas or air with the liquid, a cone-shaped vessel provided with a perforated diaphragm and an outlet-pipe for drawing off the saturated gas or air, a pump to supply and circulate the liquid, and an overflow vessel to collect and return to the pump the liquid not entrained or taken up by the gas or air in passing through the vaporizing-chamber, substantially as specified.

2. In mixing or combining apparatus for fluids, a mixing or incorporating chamber B, inlets thereto for gas or air and for liquid, and a conical diffusing vessel I set concentrically within said chamber B, provided on its exterior with a series of dripping ledges or flanges J increasing in diameter from the top downward, said vessel being provided with means for conveying away the saturated gas or air, substantially as specified.

3. In mixing or combining apparatus for fluids, a mixing or incorporating chamber, provided with inlets and outlets for gas or air and for liquid to be incorporated therewith, a conical diffusing vessel therein having circular dripping ledges or flanges of diminishing diameter from the top downward, perforations at the bottom to permit the saturated gas or air to rise in the conical vessel, and a discharge-pipe at its top, substantially as described.

4. In mixing and combining apparatus for fluids, a mixing or combining chamber B, a conical diffusing vessel therein having dripping-ledges of an increasing diameter from the top downward, inlets at the bottom for saturated air or gas, the annular space around this vessel filled with pervious material to diffuse and combine the liquid and air or gas as these descend to the bottom, substantially as specified.

5. In mixing or combining apparatus for fluids, a supply-tank for liquid, a mixing or incorporating chamber placed at a higher position, means for drawing off the mixed air and vapor, a pump to raise the liquid to this chamber, and a drain-pipe to return the surplus liquid to the pump, and in combination, a collecting-chamber C having a valve and float forming a seal to prevent the flow of air or gas to the pump, substantially as described.

6. In mixing or combining apparatus for fluids, a supply vessel A for liquid, a mixing or combining chamber B, placed at a higher level, a pipe R connecting said chamber with said supply vessel, with a check-valve therein to prevent the backflow of air, vapor or other fluid from the said mixing or combining chamber, and a means located within said chamber B for drawing off the mixed air and vapor, substantially as specified.

7. In mixing or combining apparatus for fluids, a supply vessel A for liquid, a pump to raise the liquid to the top of a mixing and combining chamber above, a siphon suction-pipe from the supply vessel to pump intersected by a draining-pipe K from the bottom of the mixing and combining chamber, a valve and float to prevent the passage of air or gas to the pump, all combined and operating substantially as specified.

8. In combining or mixing apparatus for fluids, a combining and mixing chamber B provided with devices to diffuse and incorporate the fluids to be mixed or combined, a liquid-supply vessel A, a pump to raise and circulate the liquid, and the overflow-chamber C, with connecting-pipes and a float-valve whereby surplus liquid from the mixing and combining chamber is returned thereto, substantially as specified.

VALENTINE J. A. REY.

Witnesses:
ALFRED A. ENQUIST,
UPTON SMITH.